United States Patent
Hu et al.

(10) Patent No.: US 11,623,403 B2
(45) Date of Patent: Apr. 11, 2023

(54) FEEDING DEVICES AND 3D PRINTING APPARATUSES

(71) Applicant: SHENZHEN ANYCUBIC TECHNOLOGY CO., LTD., Shenzhen (CN)

(72) Inventors: Guiyuan Hu, Shenzhen (CN); Xin Ouyang, Shenzhen (CN)

(73) Assignee: SHENZHEN ANYCUBIC TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 17/453,181

(22) Filed: Nov. 2, 2021

(65) Prior Publication Data

US 2022/0176631 A1 Jun. 9, 2022

(30) Foreign Application Priority Data

Dec. 7, 2020 (CN) .......................... 202011429804.5

(51) Int. Cl.
| | |
|---|---|
| *B29C 64/321* | (2017.01) |
| *B33Y 30/00* | (2015.01) |
| *B29C 64/255* | (2017.01) |
| *B33Y 40/00* | (2020.01) |

(52) U.S. Cl.
CPC .......... *B29C 64/321* (2017.08); *B29C 64/255* (2017.08); *B33Y 30/00* (2014.12); *B33Y 40/00* (2014.12)

(58) Field of Classification Search
CPC ... B29C 64/321; B29C 64/124; B29C 64/129; B29C 64/135
See application file for complete search history.

(56) References Cited

U.S. PATENT DOCUMENTS

| | | | |
|---|---|---|---|
| 2018/0281284 A1* | 10/2018 | Elgar | B29C 64/176 |
| 2020/0147881 A1 | 5/2020 | Medalsy et al. | |
| 2020/0298471 A1 | 9/2020 | Medalsy et al. | |

FOREIGN PATENT DOCUMENTS

| | | | |
|---|---|---|---|
| CN | 208930724 U | * | 6/2019 |
| CN | 208930724 U | | 6/2019 |
| CN | 211683512 U | * | 10/2020 |
| CN | 211683512 U | | 10/2020 |

* cited by examiner

*Primary Examiner* — Leith S Shafi
*Assistant Examiner* — Nicholas J Chidiac
(74) *Attorney, Agent, or Firm* — Bayramoglu Law Offices LLC

(57) ABSTRACT

Disclosed are a feeding device and a 3D printing apparatus. The feeding device includes a resin vat, a driving device and a conveying device. The driving device is connected to the resin vat, the driving device is connected to a container filled with a resin liquid through the conveying device, and the interior of the container is further in communication with the resin vat through the conveying device. When the height of the resin liquid inside the resin vat is lower than a first preset height, the driving device inputs gas into the container through the conveying device, such that the resin liquid inside the container is conveyed into the resin vat through the conveying device, thereby achieving automatic feeding to avoid a model printing failure due to lack of the resin liquid.

17 Claims, 2 Drawing Sheets

FEEDING DEVICES AND 3D PRINTING APPARATUSES

CROSS REFERENCE TO THE RELATED APPLICATIONS

This application is based upon and claims priority to Chinese Patent Application No. 202011429804.5 filed on Dec. 7, 2020, the entire contents of which are incorporated herein by reference.

TECHNICAL FIELD

The present disclosure relates to the technical field of stereoscopic printing, and in particular to feeding devices and 3D printing apparatuses.

BACKGROUND 3D printing apparatuses, also known as three-dimensional printing apparatuses, are machines using rapid prototyping technology, and construct three-dimensional entities in a layer-by-layer printing manner by using a forming material on the basis of digital model files. The 3D printing apparatuses have been widely applied to the fields such as industrial designs, architectures and aerospaces.

When the existing photocuring 3D printing apparatus works, if a resin liquid inside a resin vat is insufficient, the resin liquid needs to be manually added. Then, there can be a condition in which the 3D printing apparatus runs out of the resin liquid in the printing process, but a new resin liquid is not manually supplemented. In this case a model printing failure may occur, and the resin liquid needs to be supplemented for reprinting, thus resulting in a low printing efficiency.

SUMMARY

An objective of an embodiment of the present disclosure is to provide a feeding device and a 3D printing apparatus, which solves the technical problems of a model printing failure and a low printing efficiency caused by manual feeding of an existing 3D printing apparatus.

In order to achieve the above objective, an embodiment of the present disclosure provides a feeding device. The feeding device includes a resin vat, a driving device and a conveying device, wherein the driving device is connected to the resin vat, the driving device is connected to a container filled with a resin liquid through the conveying device, and the interior of the container is further in communication with the resin vat through the conveying device; and if the height of the resin liquid inside the resin vat is lower than a first preset height, the driving device inputs gas into the container through the conveying device, such that the resin liquid inside the container is conveyed into the resin vat through the conveying device.

Optionally, if the height of the resin liquid inside the resin vat is higher than a second preset height, the driving device extracts the gas from the container through the conveying device, such that the resin liquid flows back to the container, wherein the second preset height is greater than the first preset height.

Optionally, the conveying device includes a container cover, a first connecting pipe and a second connecting pipe, wherein the first connecting pipe and the second connecting pipe are arranged on the container cover; and the container cover is connected to the container, the first connecting pipe penetrates the container cover, a first end of the first connecting pipe is connected to the driving device, a second end of the first connecting pipe is arranged inside the container, the second connecting pipe penetrates the container cover, a first end of the second connecting pipe is located inside the resin vat, and a second end of the second connecting pipe is arranged inside the container.

Optionally, a first through hole and a second through hole that penetrate the container cover are respectively provided on the container cover, the first connecting pipe penetrates the first through hole, and the second connecting pipe penetrates the second through hole. Optionally, the second connecting pipe includes a first connecting sub-pipe and a second connecting sub-pipe, wherein a first end of the first connecting sub-pipe is located inside the resin vat, the second connecting sub-pipe is located inside the container, and a second end of the first connecting sub-pipe penetrates the second through hole to be connected to a first end of the second connecting sub-pipe; and a distance between a second end of the second connecting sub-pipe and a bottom wall of the container is less than a preset value.

Optionally, the driving device includes a fixed seat, an elastic component and a rotating component, wherein the fixed seat is connected to the resin vat, a first end of the elastic component is connected to the fixed seat, and a second end of the elastic component is connected to the rotating component.

Optionally, the driving device further includes a vacuum pump, wherein the vacuum pump is arranged inside the fixed seat, the vacuum pump is connected to the first end of the first connecting pipe, and the vacuum pump is configured to input the gas into the container through the first connecting pipe, or the vacuum pump is configured to extract the gas from the container through the first connecting pipe.

Optionally, a third through hole is provided on the side of the fixed seat away from an outer wall of the resin vat, and a fourth through hole is provided on the side of the rotating component away from the bottom of the resin vat; and the first end of the first connecting pipe penetrates the third through hole, and the first end of the second connecting pipe penetrates the fourth through hole.

Optionally, the driving device further includes a liquid level detector, wherein the liquid level detector is arranged on the side of the rotating component close to the bottom of the resin vat, and the liquid level detector is configured to detect the height of the resin liquid inside the resin vat.

An embodiment of the present disclosure further provides a 3D printing apparatus. The 3D printing apparatus includes the above feeding device.

One of the above technical solutions has the following advantages or beneficial effects:

in an embodiment of the present disclosure, if the height of the resin liquid inside the resin vat is lower than a first preset height, the driving device inputs gas into the container through the conveying device, such that the resin liquid inside the container is conveyed into the resin vat through the conveying device, thus under conditions that a liquid level height of the resin liquid inside the resin vat is low and that the printing apparatus can be lack of the resin liquid, automatic feeding is achieved to avoid a model printing failure due to lack of the resin liquid, and thereby printing efficiency is improved without manually supplementing the resin liquid to reprint a model.

DETAILED DESCRIPTION OF THE EMBODIMENTS

The technical solutions in the embodiments of the present disclosure will be clearly and completely described below in conjunction with the accompanying drawings in the embodiments of the present disclosure. Apparently, the embodiments described are some rather than all of the embodiments of the present disclosure. Based on the embodiments of the present disclosure, all other embodiments obtained by those of ordinary skill in the art without involving any inventive effort fall within the scope of protection of the present disclosure.

Figure 1:
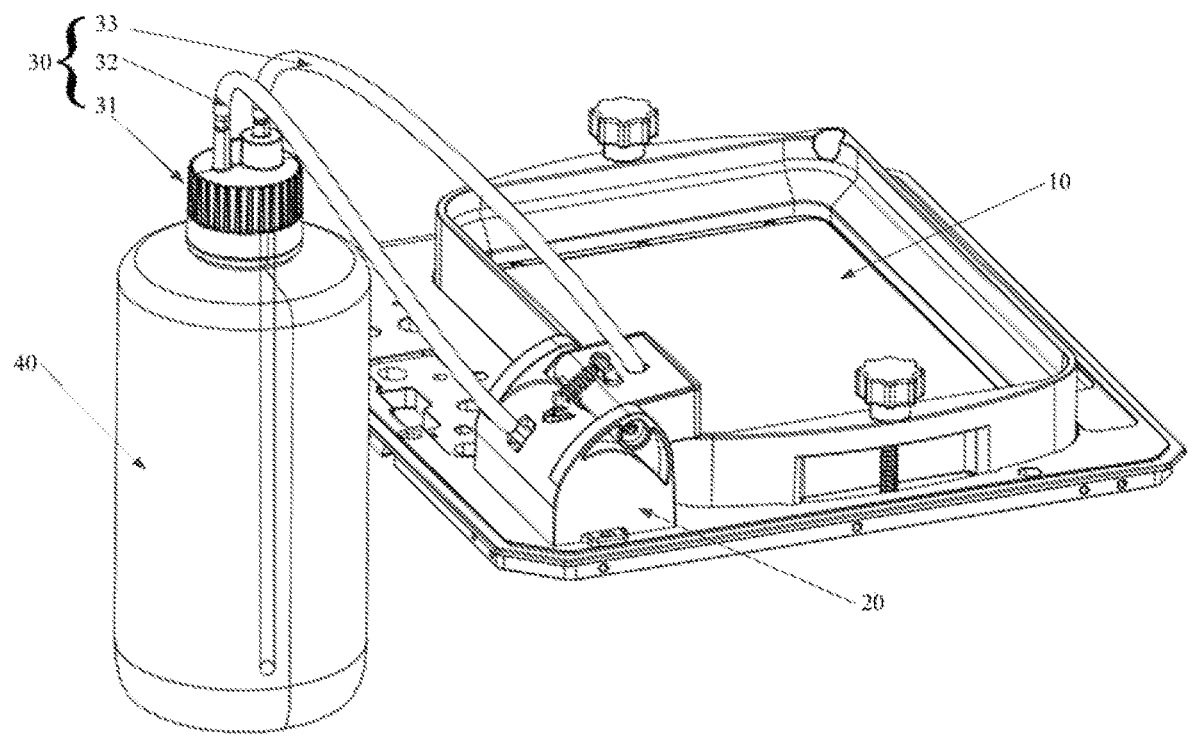
FIG. 1 is a structural diagram of a feeding device provided in an embodiment of the present disclosure.

As shown in FIG. 1, an embodiment of the present disclosure provides a feeding device. The feeding device includes a resin vat 10, a driving device 20 and a conveying device 30, wherein the driving device 20 is connected to the resin vat 10, the driving device 20 is connected to a container 40 filled with a resin liquid through the conveying device 30, and the interior of the container 40 is further in communication with the resin vat 10 through the conveying device 30.

If the height of the resin liquid inside the resin vat 10 is lower than a first preset height, the driving device 20 inputs gas into the container 40 through the conveying device 30, such that the resin liquid inside the container 40 is conveyed into the resin vat 10 through the conveying device 30.

Optionally, in some embodiments, the above container 40 can be a resin bottle without a bottle cap, the conveying device 30 is connected to the container 40, the container 40 can be provided with a closed accommodating cavity, and the accommodating cavity can be in communication with the resin vat 10 through the conveying device 30. Thus, the accommodating cavity can be connected to the resin vat 10 through the conveying device 30.

Optionally, in some embodiments, the container 40 can be provided with a closed accommodating cavity, the container 40 can also be in communication with the resin vat 10 through the conveying device 30.

The feeding device provided in the embodiment of the present disclosure can be applied to a 3D printing apparatus, and the above resin vat 10 is of a vat body structure for containing the resin liquid in the 3D printing apparatus. In the process of using the 3D printing apparatus, the above driving device 20 may detect a liquid level height of the resin liquid inside the resin vat 10, and if the height of the resin liquid inside the resin vat 10 is lower than the first preset height, it is indicated that the resin liquid inside the resin vat 10 can be exhausted, and the resin liquid needs to be conveyed into the resin vat 10. At the moment, the driving device 20 may input the gas into the container 40 through the conveying device 30, thereby increasing the intensity of pressure in the container 40, and the resin liquid inside the container 40 is conveyed into the resin vat 10 through the conveying device 30.

It should be understood that in the embodiment of the present disclosure, air can be provided as the mentioned gas above in order to reduce cost. In other embodiments, other gas can also be provided as the gas, for example, in order to avoid oxidation, inert gas such as argon, etc. can be used.

In an embodiment of the present disclosure, the feeding device includes the resin vat 10, the driving device 20 and the conveying device 30. The driving device 20 is connected to the resin vat 10, the driving device 20 is connected to a container 40 filled with a resin liquid through the conveying device 30, and the interior of the container 40 is further in communication with/connected to the resin vat 10 through the conveying device 30. Thus, under conditions that a liquid level height of the resin liquid inside the resin vat 10 is low and that the printing apparatus may be lack of the resin liquid, automatic feeding can be achieved to avoid a model printing failure due to lack of the resin liquid, and thereby printing efficiency is improved without manually supplementing the resin liquid to reprint a model.

It should be understood that in the embodiment of the present disclosure, the resin liquid inside the container 40 can be conveyed into the resin vat 10, the resin liquid inside the resin vat 10 can also be further recycled, that is, the resin liquid inside the resin vat 10 is conveyed into the container 40, thereby avoiding wasting of the resin liquid. For example, in the embodiment of the present disclosure, if the height of the resin liquid inside the resin vat 10 is higher than a second preset height, the driving device 20 extracts the gas from the container 40 through the conveying device 30, thus, the resin liquid flows back to the container 40, wherein the second preset height is greater than the first preset height.

If the height of the resin liquid inside the resin vat 10 is higher than the second preset height, it is indicated that the resin liquid inside the resin vat 10 is excessive, and the resin liquid inside the resin vat 10 needs to be recycled to the container 40. The driving device 20 extracts the gas from the container 40 through the conveying device 30 to reduce the intensity of pressure in the container 40, such that the resin liquid inside the resin vat 10 may flow back to the container 40 through the conveying device 30, and it should be understood that, at this moment, the liquid level height of the resin liquid inside the container 40 needs to meet a certain condition that the container 40 needs to have a certain space to accommodate the flowing-back resin liquid.

According to the embodiment, the resin liquid is recycled through extracting the gas from the container 40 via the driving device 20, thereby avoiding the wasting of the resin liquid in a printing process.

Optionally, the conveying device 30 includes a container cover 31, a first connecting pipe 32 and a second connecting pipe 33. The first connecting pipe 32 and the second connecting pipe 33 are arranged on the container cover 31; and the container cover 31 is connected to the container 40, the first connecting pipe 32 penetrates the container cover 31, a first end of the first connecting pipe 32 is connected to the driving device 20, a second end of the first connecting pipe 32 is arranged inside the container 40, the second connecting pipe 33 penetrates the container cover 31, a first end of the second connecting pipe 33 is located inside the resin vat 10, and a second end of the second connecting pipe 33 is arranged inside the container 40.

The first connecting pipe 32 and the second connecting pipe 33 can be hoses made of rubber or other materials, and when the container 40 is a resin bottle, the above container cover 31 can be a resin bottle cover, and the container cover 31 is connected to the container 40, thus the container 40 can be provided with a closed accommodating cavity.

In this embodiment, the second end of the first connecting pipe 32 and the second end of the second connecting pipe 33 are both arranged inside the container 40. In an optional embodiment, a distance between the second end of the first connecting pipe 32 and a bottom wall of the container 40 is greater than the liquid level height of the resin liquid contained in the container 40, and the second end of the second connecting pipe 33 is configured to contact with the bottom wall of the container 40. Thus, the first connecting pipe 32 does not contact with the resin liquid inside the container 40, and the second connecting pipe 33 makes contact with the resin liquid inside the container 40.

In a further optional embodiment, the distance between the second end of the first connecting pipe 32 and the bottom wall of the container 40 is less than the liquid level height of the resin liquid contained in the container 40, or the distance between the second end of the first connecting pipe and the bottom wall of the container is equal to the liquid level height of the resin liquid contained in the container 40, and the second end of the second connecting pipe 33 is configured to make contact with the bottom wall of the container 40. Thus, the first connecting pipe 32 and the second connecting pipe 33 both make contact with the resin liquid inside the container 40.

In the embodiments, the second end of the second connecting pipe 33 is configured to make contact with the bottom wall of the container 40, to guarantee that all the resin liquid contained in the container 40 can be conveyed into the resin vat 10 through the second connecting pipe 33.

There can be a condition in which resin liquids of different colors need to be used in the process of printing the model. Under this condition, a plurality of containers 40 are needed, each container 40 is filled with one color of resin liquid, the conveying device 30 can be adapted to the plurality of containers 40 in the printing process, and when the conveying device 30 is adapted to each container 40, the feeding device may achieve an automatic feeding function described in this embodiment to convey the resin liquid inside each container 40 to the resin vat 10 such that the resin liquids of a plurality of colors can be conveyed into the resin vat 10.

Under this condition, the distance between the second end of the first connecting pipe 32 and the bottom wall of the container 40 is greater than the liquid level height of the resin liquid contained in the container 40, such that the first connecting pipe 32 does not make contact with the resin liquid contained in the container 40, and when the containers 40 filled with the resin liquids of different colors are adapted, only the second connecting pipe 33 needs to be cleaned such that mixing of the resin liquids of different colors can be avoided.

Another possible condition is that when printing is completed and the feeding is stopped, the driving device 20 is controlled to extract the gas from the container 40, such that the resin liquid inside the resin vat 10 flows back to the container 40, or the resin liquid remaining inside the second connecting pipe 33 flows back to the container.

Optionally, a first through hole and a second through hole that penetrate the container cover 31 are respectively provided on the container cover 31, the first connecting pipe 32 penetrates the first through hole, and the second connecting pipe 33 penetrates the second through hole.

The first through hole and the second through hole that penetrate the container cover 31 are respectively provided on the container cover 31, wherein the shapes of the first through hole and the second through hole are related to those of the first connecting pipe 32 and the second connecting pipe 33, and if the first connecting pipe 32 and the second connecting pipe 33 are circular pipes, the first through hole and the second through hole are circular holes. The first through hole and the second through hole are provided on the container cover 31, such that the first connecting pipe 32 and the second connecting pipe 33 penetrate the container cover 31.

Optionally, the second connecting pipe 33 includes a first connecting sub-pipe and a second connecting sub-pipe, wherein a first end of the first connecting sub-pipe is located inside the resin vat 10, the second connecting sub-pipe is located inside the container 40, and a second end of the first connecting sub-pipe penetrates the second through hole to be connected to a first end of the second connecting sub-pipe; and a distance between a second end of the second connecting sub-pipe and a bottom wall of the container 40 is less than a preset value.

In this embodiment, the distance between the second end of the second connecting sub-pipe and the bottom wall of the container 40 is less than the preset value, wherein the preset value is less than the liquid level height of the resin liquid contained in the container 40, to guarantee that the second connecting sub-pipe makes contact with the resin liquid inside the container 40, and the resin liquid inside the container 40 can be conveyed into the resin vat 10 through the second connecting pipe 33, thereby achieving feeding.

One preferred implementation is that the second end of the second connecting sub-pipe makes contact with the bottom wall of the container 40, and under this condition, it can be guaranteed that all the resin liquid inside the container 40 can be conveyed into the resin vat through the conveying device 30.

Optionally, the driving device 20 includes a fixed seat 21, an elastic component 22 and a rotating component 23, wherein the fixed seat 21 is connected to the resin vat 10, a first end of the elastic component 22 is connected to the fixed seat 21, and a second end of the elastic component 22 is connected to the rotating component 23.

Figure 2:
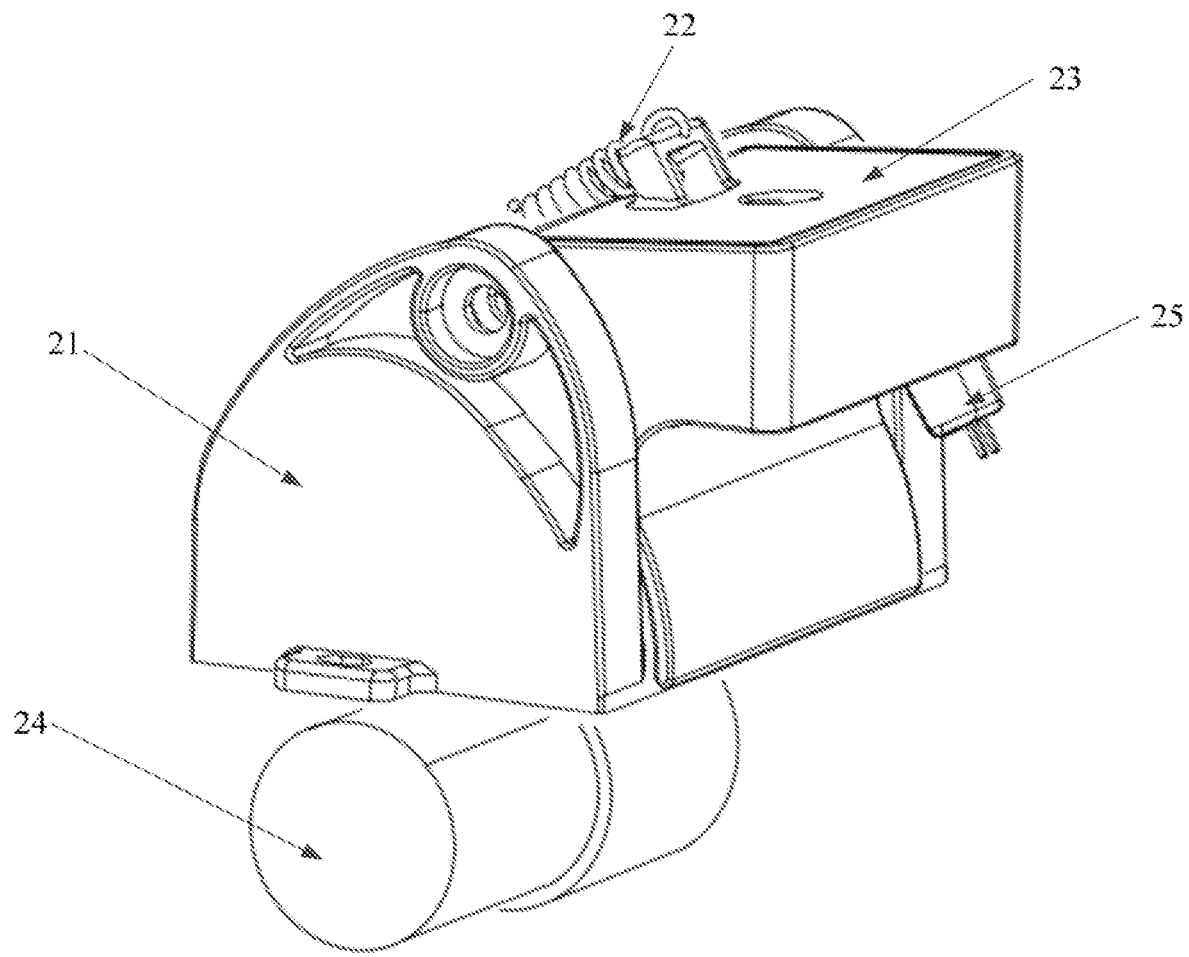
FIG. 2 is a structural diagram of a driving device in an embodiment of the present disclosure.

With reference to FIG. 2, FIG. 2 is a structural diagram of the driving device in an embodiment of the present disclosure. As shown in this figure, the driving device 20 includes the fixed seat 21, the elastic component 22 and the rotating component 23, wherein the above elastic component 22 can be a spring. The driving device 20 is movably connected to the resin vat 10, and after printing is completed, the rotating component 23 can be controlled to rotatably lift through an extension spring, such that the resin vat 10 is separated from the driving device 20 to remove the resin vat 10.

Optionally, the driving device 20 further includes a vacuum pump 24, wherein the vacuum pump 24 is arranged inside the fixed seat 21, and the vacuum pump 24 is connected to the first end of the first connecting pipe 32; and the vacuum pump 24 is configured to input the gas into the container 40 through the first connecting pipe 32, or the vacuum pump is configured to extract the gas from the container 40 through the first connecting pipe 32.

With further reference to FIG. 2, as shown in this figure, the driving device 20 further includes the vacuum pump 24 arranged inside the fixed seat 21. The above vacuum pump 24 has two working modes, wherein one working mode is to increase the intensity of pressure in the container 40 by inputting the gas into the container 40 through the first connecting pipe 32; and the other working mode is to reduce the intensity of pressure in the container 40 by extracting the gas from the container 40 through the first connecting pipe 32.

Optionally, a third through hole is provided on the side of the fixed seat 21 away from an outer wall of the resin vat 10, and a fourth through hole is provided on the side of the rotating component 23 away from the bottom of the resin vat 10; and the first end of the first connecting pipe 32 penetrates the third through hole, and the first end of the second connecting pipe 33 penetrates the fourth through hole.

The third through hole is provided on the side of the fixed seat 21 away from the outer wall of the resin vat 10, and the fourth through hole is provided on the side of the rotating component 23 away from the bottom of the resin vat 10. The first end of the first connecting pipe 32 penetrates the third through hole to be connected to the vacuum pump 24, such that when the vacuum pump 24 works, the gas can be input into the container 40 through the first connecting pipe 32 to increase the intensity of pressure in the container 40, and the resin liquid inside the container 40 is conveyed into the resin vat 10 through the second connecting pipe 33; or, the gas is extracted from the container 40 through the first connecting pipe 32 to reduce the intensity of pressure in the container 40, such that the resin liquid inside the resin vat 10 flows back to the container 40 through the second connecting pipe 33.

Optionally, the driving device 20 further includes a liquid level detector 25, wherein the liquid level detector 25 is arranged on the side of the rotating component 23 close to the bottom of the resin vat 10; and the liquid level detector 25 is configured to detect the height of the resin liquid inside the resin vat 10.

According to FIG. 2, as shown in this figure, the liquid level detector 25 is arranged on the side of the rotating component 23 close to the bottom of the resin vat 10, and the liquid level detector 25 may detect the liquid level height of the resin liquid inside the resin vat 10, such that the driving device 20 conveys the gas into the container 40, or the driving device 20 extracts the gas from the container 40.

The embodiment of the present disclosure further provides a 3D printing apparatus. The 3D printing apparatus includes the above feeding device, wherein the structure of the feeding device may refer to the above embodiments, and the details are not repeated herein. In this embodiment, the feeding device in the above embodiments is used, and therefore, the 3D printing apparatus provided in the embodiment of the present disclosure has the same beneficial effects as those of the feeding device in the above embodiments.

The foregoing description merely relates to the particular embodiments of the present disclosure, but the scope of protection of the present disclosure is not limited thereto. Any changes or substitutions that can be easily conceived by those skilled in the art within the technical scope disclosed by the present disclosure shall fall within the scope of protection of the present disclosure. Therefore, the scope of protection of the present disclosure should be subject to the scope of protection of the claims.

What is claimed is:

1. A feeding device, comprising:
a resin vat;
a pump device comprising a fixed seat, an elastic component, a rotating component and a liquid level detector arranged on a side of the rotating component, wherein the fixed seat is connected to the resin vat, a first end of the elastic component is connected to the fixed seat, and a second end of the elastic component is connected to the rotating component such that the pump device is movably connected to the resin vat and a rotatable lift of the rotating component is controllable through the elastic component; and
a pipe system,
wherein the pump device is connected to the resin vat, the pump device is connected to a container filled with a resin liquid through the pipe system, and an interior of the container is connected to the resin vat through the pipe system,
wherein the pump device is configured to input gas into the container through the pipe system when a height of the resin liquid inside the resin vat is lower than a first preset height, wherein the pipe system is configured to convey the resin liquid inside the container into the resin vat,
wherein liquid level detector is configured to detect the height of the resin liquid inside the resin vat.

2. The feeding device according to claim 1, wherein the side of the rotating component is adjacent to a bottom of the resin vat.

3. The feeding device according to claim 1, wherein the pump device is configured to extract the gas from the container through the pipe system when the height of the resin liquid inside the resin vat is higher than a second preset height, wherein the resin liquid flows back to the container; and
the second preset height is greater than the first preset height.

4. The feeding device according to claim 3, wherein the pipe system comprises a container cover, a first connecting pipe and a second connecting pipe, wherein
the first connecting pipe and the second connecting pipe are arranged on the container cover;
the container cover is connected to the container;
the first connecting pipe penetrates the container cover, wherein a first end of the first connecting pipe is connected to the pump device, and a second end of the first connecting pipe is arranged inside the container; and
the second connecting pipe penetrates the container cover, wherein a first end of the second connecting pipe is located inside the resin vat, and a second end of the second connecting pipe is arranged inside the container.

5. The feeding device according to claim 1, wherein the pipe system comprises a container cover, a first connecting pipe and a second connecting pipe, wherein
the first connecting pipe and the second connecting pipe are arranged on the container cover;
the container cover is connected to the container;
the first connecting pipe penetrates the container cover, wherein a first end of the first connecting pipe is connected to the pump device, and a second end of the first connecting pipe is arranged inside the container; and
the second connecting pipe penetrates the container cover, wherein a first end of the second connecting pipe is located inside the resin vat, and a second end of the second connecting pipe is arranged inside the container.

6. The feeding device according to claim 5, wherein a first through hole and a second through hole are respectively provided on the container cover, wherein the first through hole and the second through hole penetrate the container cover; and
the first connecting pipe penetrates the first through hole, and the second connecting pipe penetrates the second through hole.

7. The feeding device according to claim 6, wherein the second connecting pipe comprises a first connecting sub-pipe and a second connecting sub-pipe;
wherein a first end of the first connecting sub-pipe is located inside the resin vat, the second connecting sub-pipe is located inside the container, a second end of the first connecting sub-pipe penetrates the second through hole to he connected to a first end of the second connecting sub-pipe, and a distance between a second end of the second connecting sub-pipe and a bottom wall of the container is less than a preset value.

8. The feeding device according to claim 5, wherein
the pump device further comprises a vacuum pump, wherein the vacuum pump is arranged inside the fixed seat, and the vacuum pump is connected to the first end of the first connecting pipe; and
the vacuum pump is configured to input the gas into the container through the first connecting pipe, or the vacuum pump is configured to extract the gas from the container through the first connecting pipe.

9. A feeding device, comprising:
a resin vat;
a pump device; and
a pipe system,
wherein the pump device is connected to the resin vat, the pump device is connected to a container filled with a resin liquid through the pipe system, and an interior of the container is connected to the resin vat through the pipe system,
wherein the pump device is configured to input gas into the container through the pipe system when a height of the resin liquid inside the resin vat is lower than a first preset height, wherein the pipe system is configured to convey the resin liquid inside the container into the resin vat,
the pipe system comprises a container cover, a first connecting pipe and a second connecting pipe, wherein
the first connecting pipe and the second connecting pipe are arranged on the container cover
the container cover is connected to the container,
the first connecting pipe penetrates the container cover, wherein a first end of the first connecting pipe is connected to the pump device, and a second end of the first connecting pipe is arranged inside the container,
the second connecting pipe penetrates the container cover, wherein a first end of the second connecting pipe is located inside the resin vat, and a second end of the second connecting pipe is arranged inside the container,
wherein the pump device comprises a fixed seat, an elastic component and a rotating component,
wherein the fixed seat is connected to the resin vat, a first end of the elastic component is connected to the fixed seat, and a second end of the elastic component is connected to the rotating component, and wherein
a third through hole is provided on a side of the fixed seat, wherein the side of the fixed seat is away from an outer wall of the resin vat;
a fourth through hole is provided on a side of the rotating component, wherein the side of the rotating component is away from a bottom of the resin vat; and
the first end of the first connecting pipe penetrates the third through hole, and the first end of the second connecting pipe penetrates the fourth through hole.

10. A 3D printing apparatus, comprising:
a resin vat;
a pump device comprising a fixed seat, an elastic component, a rotating component and a liquid level detector arranged on a side of the rotating component, wherein the fixed seat is connected to the resin vat, a first end of the elastic component is connected to the fixed seat, and a second end of the elastic component is connected to the rotating component such that the pump device is movably connected to the resin vat and a rotatable lift of the rotating component is controllable through the elastic component; and
a pipe system,
wherein the pump device is connected to the resin vat, the pump device is connected to a container filled with a resin liquid through the pipe system, and an interior of the container is connected to the resin vat through the pipe system,
wherein the pump device is configured to input gas into the container through the pipe system when a height of the resin liquid inside the resin vat is lower than a first preset height, wherein the pipe system is configured to convey the resin liquid inside the container into the resin vat,
wherein liquid level detector is configured to detect the height of the resin liquid inside the resin vat.

11. The 3D printing apparatus according to claim 10, wherein
the pump device is configured to extract the gas from the container through the pipe system when the height of the resin liquid inside the resin vat is higher than a second preset height, wherein the resin liquid flows back to the container; and
the second preset height is greater than the first preset height.

12. The 3D printing apparatus according to claim 10, wherein
the side of the rotating component is adjacent to a bottom of the resin vat.

13. The 3D printing apparatus according to claim 10, wherein
the pipe system comprises a container cover, a first connecting pipe and a second connecting pipe, wherein
the first connecting pipe and the second connecting pipe are arranged on the container cover;
the container cover is connected to the container;
the first connecting pipe penetrates the container cover, wherein a first end of the first conecting pipe is connected to the pump driving device, and a second end of the first connecting pipe is arranged inside the container; and
the second connecting pipe penetrates the container cover, wherein a first end of the second connecting pipe is located inside the resin vat, and a second end of the second connecting pipe is arranged inside the container.

14. The 3D printing apparatus according to claim 13, wherein
the pump device further comprises a vacuum pump, wherein the vacuum pump is arranged inside the fixed seat, and the vacuum pump is connected to the first end of the first connecting pipe; and
the vacuum pump is configured to input the gas into the container through the first connecting pipe, or the vacuum pump is configured to extract the gas from the container through the first connecting pipe.

15. The 3D printing apparatus according to claim 13, wherein
a third through hole is provided on a side of the fixed seat, wherein the side of the fixed seat is away from an outer wall of the resin vat;
a fourth through hole is provided on a side of the rotating component, wherein the side of the rotating component is away from a bottom of the resin vat; and the first end of the first connecting pipe penetrates the third through hole, and the first end of the second connecting pipe penetrates the fourth through hole.

16. The 3D printing apparatus according to claim 13, wherein
   a first through hole and a second through hole are respectively provided on the container cover, wherein the first through hole and the second through hole penetrate the container cover; and
   the first connecting pipe penetrates the first through hole, and the second connecting pipe penetrates the second through hole.

17. The 3D printing apparatus according to claim 16, wherein
   the second connecting pipe comprises a first connecting sub-pipe and a second connecting sub-pipe;
   wherein a first end of the first connecting sub-pipe is located inside the resin vat, the second connecting sub-pipe is located inside the container, a second end of the first connecting sub-pipe penetrates the second through hole to be connected to a first end of the second connecting sub-pipe, and a distance between a second end of the second connecting sub-pipe and a bottom wall of the container is less than a preset value.

\* \* \* \* \*